US006587561B1

(12) United States Patent
Sered et al.

(10) Patent No.: US 6,587,561 B1
(45) Date of Patent: Jul. 1, 2003

(54) KEY DELIVERY IN A SECURE BROADCASTING SYSTEM

(75) Inventors: Yishai Sered, Jerusalem (IL); Nigel Stephen Dallard, Eastleigh (GB)

(73) Assignee: NDS Ltd., West Drayton (GB)

( * ) Notice: Subject to any disclaimer, the term of this patent is extended or adjusted under 35 U.S.C. 154(b) by 0 days.

(21) Appl. No.: 09/244,597

(22) Filed: Feb. 4, 1999

(30) Foreign Application Priority Data

Mar. 4, 1998 (IL) .............................................. 123554

(51) Int. Cl.[7] .............................................. H04N 7/167
(52) U.S. Cl. ..................... 380/241; 380/201; 380/204; 380/212; 380/231; 380/240; 705/51; 705/52; 705/57
(58) Field of Search ................................ 380/201, 204, 380/227, 228, 224, 230, 231, 240, 242, 279, 283; 713/160, 162, 163, 201; 705/51, 52, 57

(56) References Cited

U.S. PATENT DOCUMENTS

| | | | |
|---|---|---|---|
| 4,228,321 A | 10/1980 | Flanagan .................. 179/1.5 S |
| 4,484,027 A | 11/1984 | Lee et al. ................. 178/22.13 |
| 4,531,020 A | 7/1985 | Wechselberger et al. . 178/22.08 |
| 4,531,021 A | 7/1985 | Bluestein et al. ......... 178/22.08 |
| 4,864,615 A | 9/1989 | Bennett et al. ................ 380/21 |
| 4,866,770 A | 9/1989 | Seth-Smith et al. .......... 380/20 |
| RE33,189 E | 3/1990 | Lee et al. ...................... 380/20 |
| 4,944,006 A | 7/1990 | Citta et al. .................... 380/20 |
| 5,208,856 A | 5/1993 | Leduc et al. .................. 380/14 |
| 5,282,249 A | 1/1994 | Cohen et al. .................. 380/23 |
| 5,301,247 A | 4/1994 | Rasmussen et al. .......... 380/43 |
| 5,481,609 A | 1/1996 | Cohen et al. .................. 380/16 |
| 5,499,298 A | 3/1996 | Narasimhalu et al. ........ 380/25 |
| 5,825,876 A | * 10/1998 | Peterson, Jr. ............... 380/228 |
| 5,852,664 A | * 12/1998 | Iverson et al. .............. 340/5.31 |
| 5,991,400 A | * 11/1999 | Kamperman ................ 380/228 |
| 6,069,956 A | * 5/2000 | Kurihara ..................... 380/212 |
| 6,178,242 B1 | * 1/2001 | Tsuria ........................ 380/201 |

FOREIGN PATENT DOCUMENTS

| | | | | |
|---|---|---|---|---|
| EP | 0375539 A1 | 6/1990 | .......... | H04N/7/167 |
| EP | 0461029 A1 | 12/1991 | .......... | H04N/7/167 |

OTHER PUBLICATIONS

EBU Project Gropu B/CA, "Functional Model of a Conditional Access System", EBU Review Technical, Winter 1995, No. 266, Grand Saconnex, CH, XP 000559450, pp. 64–88.

European Standard—"Common Interface Specification for Conditional Access and Other Digital Video Broadcasting Decoder Applications," English Version, Feb. 1997, pp. 1–86.

Technical Specification of DVB—Simulcrypt, DVB SIM061, Jan. 4, 1997, Part I, pp. 1–44.

Guide to the use of the ATSC Digital Television Standard, Oct. 4, 1995, pp. 1–136.

ETSI Technical Report, "Digital Video Broadcasting (DVB); Support for use of Scrambling and Conditional Access (CA) Within Digital Broadcasting Systems," ETR 289, Oct. 1996, pp. 1–13.

DVB Digital Video Broadcasting, "DVB Specification for Data Broadcasting," SI–DAT 360, TM 1779, Feb. 12, 1997, pp. 1–22.

* cited by examiner

*Primary Examiner*—Justin T. Darrow (57) ABSTRACT

A key delivery method for use in an encoded communications system in which at least one encoded item including a first item encoded with a first item control word is sent in a communication stream from a sender to a receiver, the method including transmitting an item entitlement control message (IECM) including item control information, transmitting a stream entitlement control message (SECM) including stream control information, and combining at least part of the item control information and at least part of the stream control information to produce the first item control word. Related methods and apparatus are also disclosed.

19 Claims, 5 Drawing Sheets

KEY DELIVERY IN A SECURE BROADCASTING SYSTEM

FIELD OF THE INVENTION

The present invention relates to broadcast systems in general, and in particular to data broadcast systems, especially to systems providing Conditional Access services.

BACKGROUND OF THE INVENTION

Systems for ensuring that, in a pay or subscription broadcast system, only those who have paid to receive broadcast content actually do receive the broadcast content are well-known in the art. Such systems, which often include many other features, are known as Conditional Access (CA) systems. Typically, pay broadcast systems generally broadcast encrypted material and utilize a CA system to deliver one or more appropriate decryption keys to authorized receivers only.

One CA system is described in U.S. Pat. Nos. 5,282,249 and 5,481,609, both to Cohen et al. The two Cohen et al. patents describe a scrambled television system. Scrambled television transmissions described in the Cohen et al. patents include both scrambled data representing television signals and coded control messages, also known in the art as ECMs. The ECMs of Cohen et al. include, in a coded form, data necessary for generating a control word (CW) which may be used to descramble the scrambled data representing television signals.

Data necessary for generating a control word is known in the prior art to take many different forms and may include, in general, at least any of the following: a control word; an encrypted control word which is intended to be decrypted before use; and a seed to a generating function such as, for example, a one-way function which generates the control word upon input of the seed. Throughout the present specification and claims the terms "control word generating information" and "CW generating information" are used interchangeably to designate data necessary for generating a control word in any appropriate form, as described above.

While the two patents to Cohen et al. describe an analog system, that is, a system in which analog television data streams are broadcast to television sets, it is appreciated that similar ECM methods may also be used for digital television data streams, it being appreciated that scrambling methods appropriate to digital data would be used in digital television data streams.

The system of Cohen et al. and other systems described in the art share a feature of broadcasting an ECM synchronous to, generally immediately before or in a data stream parallel to, the actual scrambled broadcast. Typically, such an ECM is valid for a brief duration, with a new ECM being broadcast, in synchrony with a scrambled broadcast scrambled according to a new key, a few seconds, such as 10 seconds, after the broadcast of the previous ECM. Some systems have been described in which a key is sent, whether by broadcasting or by other means such as by mail, with a lower frequency, even once a month. Such a system is described, for example, in U.S. Pat. Nos. 4,484,027 and Re 33,189 to Lee et al.

Patents describing systems related to encrypted broadcasting and/or key distribution in encrypted broadcasting systems include the following:

U.S. Pat. No. 4,228,321 to Flanagan describes a privacy transmission system with remote key control, in which key control signals are produced at the unscrambling location and are both used for unscrambling at that location and also transmitted to a scrambling location for use in scrambling.

U.S. Pat. No. 4,531,020 to Wechselberger et al describes a method for controlling the simultaneous broadcast of enciphered digital information signals, for example in a radio or television broadcast environment, to a plurality of subscribers using several levels of enciphering keys.

U.S. Pat. No. 4,531,021 to Bluestein et al describes enciphering digital information for transmission using a first key, common to all receivers, and a second key specific to one receiver of a small group of receivers.

U.S. Pat. No. 4,864,615 to Bennett et al describes a system for reproduction of secure keys by using distributed key generation data and a distributed encrypted prekey.

U.S. Pat. No. 4,866,770 to Seth-Smith et al describes a system for distributing video, audio, teletext, and data, in which system wide, individual decoder and group decoder control signals are transmitted as part of a composite signal. The group decoder control signal includes information relating to a group of decoders, while the individual decoder control signal includes information relating to the operation of individual decoders.

U.S. Pat. No. 4,944,006 to Citta et al describes a secure data packet transmission system utilizing a global encryption key as well as address keys for encrypting individually addressed bit packets.

U.S. Pat. No. 5,301,247 to Rasmussen et al. describes a method for ensuring secure communications, in which two keys are combined together to produce a session key.

U.S. Pat. No. 5,499,298 to Narasimhalu et al describes a method for controlled dissemination of digital information, in which encrypted digital information is decrypted by a tamper-proof controlled information access device, which access being provided according to conditions specified by an information provider.

In general, methods of transmitting a scrambled digital signal, including ECMs, are well known. Some systems use a composite signal, that is, an analog or digital signal including a plurality of components. Typically the plurality of components includes both a scrambled television signal component and an ECM component, the ECM component comprising a plurality of ECMs. Prior art references which discuss examples of this type of signal include the following: DVB ETR289, "Digital Video Broadcasting (DVB): Support for use of scrambling and conditional access (CA) within digital broadcasting systems"; and DVB SIM061, "Technical specification of DVB-Simulcrypt", Apr. 1, 1997.

Other documents relating to broadcasting of digital information include the DVB Specification for Data Broadcasting, document SI-DAT 360 (TM 1779), Feb. 12, 1997; and ATSC Digital Television Standard, document A54, October 1995 and subsequent editions.

Other methods of transmitting a scrambled digital signal, particularly useful in a case where the signal includes sub-signals encoded according to various different methods, are described in "Common Interface Specification for Conditional Access and other Digital Video Broadcasting Decoder Applications", DVB document A017, May 1996 and subsequent editions; and in "Common Interface Specification for Conditional Access and other Digital Video Broadcasting Decoder Applications", CENELEC EN50221:1997.

The disclosures of all references mentioned above and throughout the present specification are hereby incorporated herein by reference.

SUMMARY OF THE INVENTION

The present invention seeks to provide an improved method for delivering a control word or key relating to an item. The present method is particularly useful in cases where the item is relatively short in duration and is transmitted asynchronously relative to an ECM stream; that is, time synchronization of the item and an associated ECM in the ECM stream cannot be guaranteed, typically because of the short duration of the item. The present method is also particularly useful in cases where the number of items is very large, and it may be impractical to assign a separate ECM stream to each item.

Cases of the types referred to may occur particularly in a data broadcast network, where a defined data item, such as a computer program or a multimedia item, is broadcast to subscribers or customers who have subscribed to or are otherwise authorized to receive the item. An item of this type may be of relatively short duration, such as between a fraction of a second and a few seconds, and there may be a very large number of items, Existing methods of sending an ECM stream synchronized with a data stream, such as a data stream comprising a television program, are inadequate to provide for control word or key delivery in the cases described above, since state of the art ECM delivery mechanisms are not able to provide synchronization to the sub-second level.

There is thus provided in accordance with a preferred embodiment of the present invention a key delivery method for use in an encoded communications system in which at least one encoded item including a first item encoded with a first item control word is sent in a communication stream from a sender to a receiver, the method including transmitting an item entitlement control message (IECM) including item control information, transmitting a stream entitlement control message (SECM) including stream control information, and combining at least part of the item control information and at least part of the stream control information to produce the first item control word.

Further in accordance with a preferred embodiment of the present invention the transmitting-IECM step is performed before the transmitting-SECM step.

Still further in accordance with a preferred embodiment of the present invention the transmitting-IECM step is performed simultaneously with the transmitting-SECM step.

Additionally in accordance with a preferred embodiment of the present invention the method also includes utilizing the first item control word to decode the at least one encoded item.

Moreover in accordance with a preferred embodiment of the present invention the item control information includes an item key, and the stream control information includes a stream key, and the combining step includes computing the first item control word from the item key and the stream key.

Further in accordance with a preferred embodiment of the present invention the item control information includes a first seed, and the stream control information includes a second seed, and the combining step includes computing an item key from the first seed using an item key production function, computing a stream key from the second seed using a stream key production function, and computing the first item control word from the item key and the stream key.

Still further in accordance with a preferred embodiment of the present invention the step of computing an item key includes determining whether the receiver is authorized to compute the item key and computing the item key only if the receiver is authorized to compute the item key.

Additionally in accordance with a preferred embodiment of the present invention the step of computing a stream key includes determining whether the receiver is authorized to compute the stream key and computing the stream key only if the receiver is authorized to compute the stream key.

Moreover in accordance with a preferred embodiment of the present invention the at least one encoded item is transmitted asynchronously to the SECM.

Further in accordance with a preferred embodiment of the present invention the at least one encoded item includes a first plurality of encoded items.

Still further in accordance with a preferred embodiment of the present invention each of the first plurality of encoded items has a time duration, and the SECM includes a second plurality of SECMs transmitted with an average inter-SECM delay, and each of the first plurality of encoded items is associated with one of the second plurality of SECMs, and the time duration of at least one of the first plurality of encoded items is less than the average inter-SECM delay.

Additionally in accordance with a preferred embodiment of the present invention more than one of the first plurality of encoded items is associated with at least one of the second plurality of SECMs.

Moreover in accordance with a preferred embodiment of the present invention the first plurality of encoded items includes at least a first encoded item and a second encoded item, and the first encoded item and the second encoded item are transmitted substantially simultaneously.

Further in accordance with a preferred embodiment of the present invention the at least one encoded item includes a plurality of encoded items including a second item encoded with a second item control word, the method also including transmitting a second SECM including second stream control information, and combining the item control information and the second stream control information to produce the second item control word.

Still further in accordance with a preferred embodiment of the present invention the item control information includes item purchase information.

Additionally in accordance with a preferred embodiment of the present invention the first stream control information includes item purchase information.

Moreover in accordance with a preferred embodiment of the present invention the second stream control information includes item purchase information.

Further in accordance with a preferred embodiment of the present invention the item purchase information includes item price information.

Still further in accordance with a preferred embodiment of the present invention the item purchase information includes purchase access information and the method includes determining whether the receiver is entitled to purchase the first item based, at least in part, on the purchase access information.

Additionally in accordance with a preferred embodiment of the present invention the item purchase information includes access information and the method includes determining whether the receiver is entitled to access the first item based, at least in part, on the access information.

Moreover in accordance with a preferred embodiment of the present invention the first item is broadcast to a plurality of item receivers including the receiver.

Further in accordance with a preferred embodiment of the present invention the step of transmitting an IECM includes broadcasting the IECM.

Still further in accordance with a preferred embodiment of the present invention the step of transmitting an SECM includes broadcasting the SECM.

There is also provided in accordance with another preferred embodiment of the present invention a key production method for use in an encoded communications system in which at least one encoded item including a first item encoded with a first item control word is sent in a communication stream from a sender to a receiver and in which an item entitlement control message (IECM) including item control information and a stream entitlement control message (SECM) including stream control information are also sent from the sender to the receiver, the method including extracting at least part of the item control information from the IECM and at least part of the stream control information from the SECM, and combining the at least part of the item control information and the at least part of the stream control information to produce the first item control word.

There is also provided in accordance with another preferred embodiment of the present invention a key delivery subsystem for use in an encoded communications system in which at least one encoded item including a first item encoded with a first item control word is sent in a communication stream from a sender to a receiver, the key delivery subsystem including an item entitlement control message (IECM) production unit operative to produce an IECM including item control information, a stream entitlement control message (SECM) production unit operative to produce a SECM including stream control information, transmitting apparatus receiving the IECM from the IECM production unit and the SECM from the SECM production unit and operative to transmit the IECM and the SECM to the receiver, and combining apparatus located at the receiver for combining at least part of the item control information and at least part of the stream control information to produce the first item control word.

There is also provided in accordance with another preferred embodiment of the present invention a key production subsystem for use in an encoded communications system in which at least one encoded item including a first item encoded with a first item control word is sent in a communication stream from a sender to a receiver and in which an item entitlement control message (IECM) including item control information and a stream entitlement control message (SECM) including stream control information are also sent from the sender to the receiver, the key production subsystem including a control information extractor for extracting at least part of the item control information from the IECM and at least part of the stream control information from the SECM, and control word production apparatus for combining the at least part of the item control information and the at least part of the stream control information to produce the first item control word.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1A:
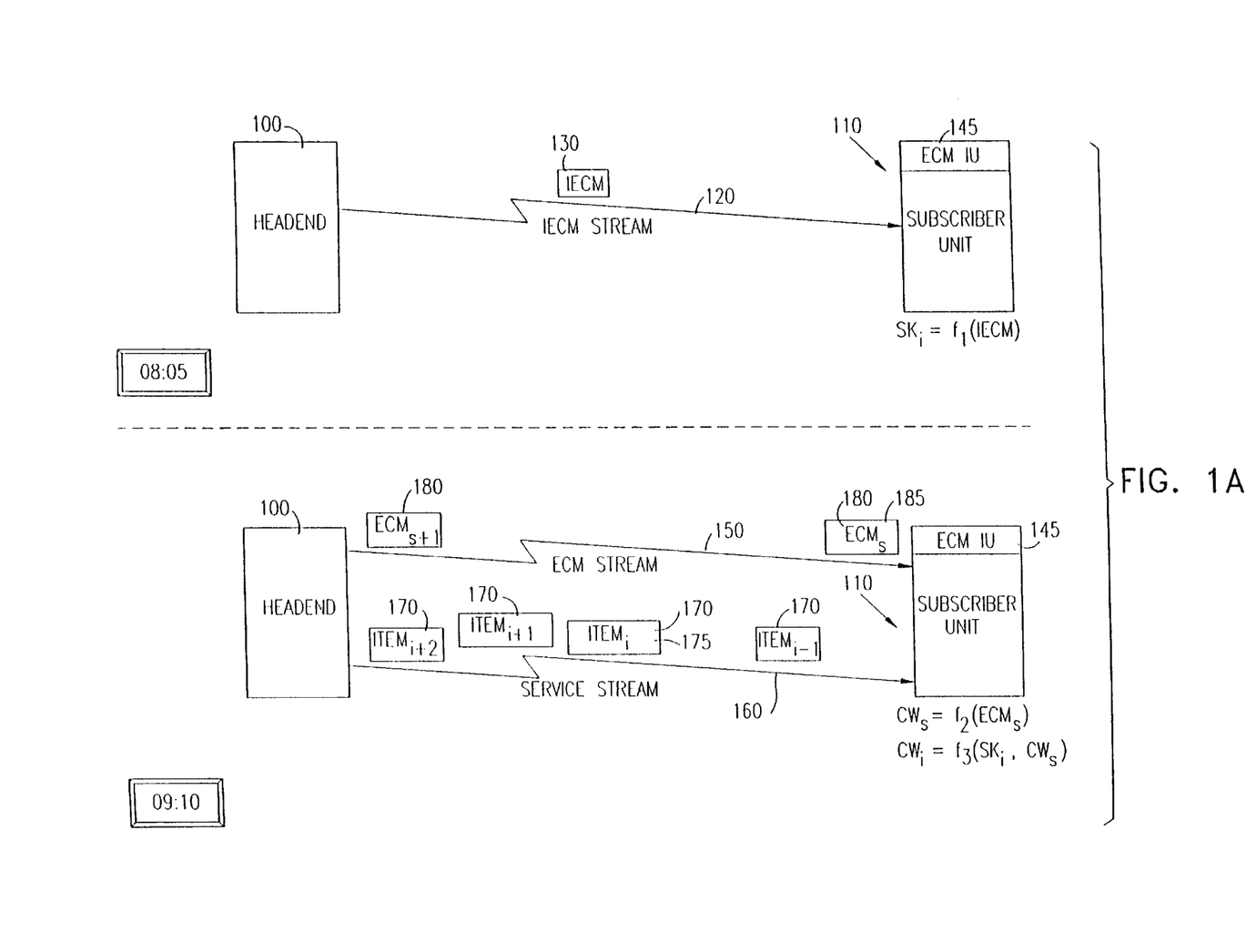
FIG. 1A is a simplified partly pictorial, partly block diagram illustration of a key delivery system constructed and operative in accordance with a preferred embodiment of the present invention.

Reference is now made to FIG. 1A which is a simplified partly pictorial, partly block diagram illustration of a key delivery system constructed and operative in accordance with a preferred embodiment of the present invention. The system of FIG. 1A typically comprises a headend 100 and at least one subscriber unit 110. Except as described below, the headend 100 and the at least one subscriber unit 110 may be similar to units which are well known in the art. Typically, a multiplicity of subscriber units 110 is provided, only one subscriber unit 110 being shown in FIG. 1A for brevity of description.

The operation of the system of FIG. 1A is now briefly described. The headend 100 is operative to establish an IECM stream 120, the IECM stream 120 comprising a communication stream, as is well known in the art, from the headend 100 to the at least one subscriber unit 110. The IECM stream 120 is typically operative, as described below, to carry at least one item ECM (IECM) such as an IECM 130, transmitted by the headend 100.

The IECM stream 120 typically comprises a logical stream which is carried by any appropriate physical communications channel (not shown), such as, for example, any appropriate one or combination of the following, which are well known in the art: a cable transmission system; a satellite transmission system; a terrestrial transmission system; and a data network, such as a local area network (LAN), a wide area network (WAN), or another data network. Establishing a stream, particularly a CA stream for carrying ECMs, over a physical communication channel is well known in the art and is described, for example, in DVB ETR289, "Digital Video Broadcasting (DVB): Support for use of scrambling and conditional access (CA) within digital broadcasting systems", referred to above.

Figure 2A:
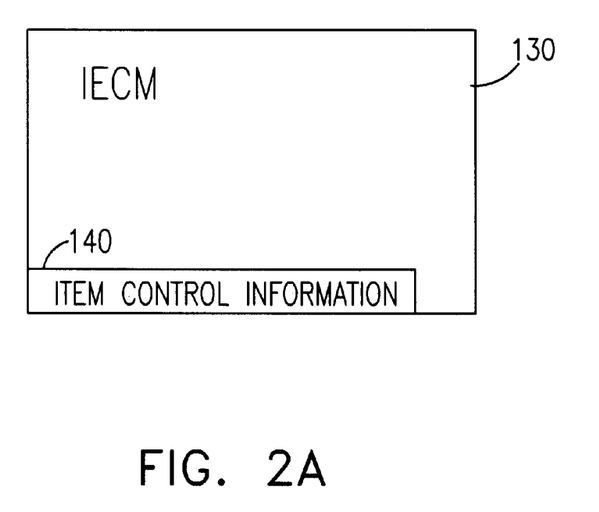
FIG. 2A is a simplified block diagram illustration of a preferred embodiment of an IECM of FIG. 1.

Reference is now additionally made to FIG. 2A which is a simplified block diagram illustration of a preferred implementation of the IECM 130. ECMs known in the art typically comprise CW generating information, as explained above, in the Background of the Invention. The IECM 130 is typically similar to an ECM as is well known in the art except that the IECM 130 comprises item control information 140 which is typically provided instead of or in addition to CW generating information comprised in prior art ECMs.

The subscriber unit 110 is typically operative, upon receiving the IECM 130, to extract the item control information 140 therefrom, using methods which are well known in the art. The item control information 140 typically comprises information relating to access to an individual broadcast item to be broadcast at some time, whether in the past, in the present, or in the future. Preferably, the subscriber unit 110 includes an ECM interpretation unit 145 which is operative to extract a first key $Sk_i$ from the IECM 130, typically according to a first generator function $f_1$, such that:

$$Sk_i = f_1(IECM_i)$$

where $IECM_i$ represents the IECM 130, taken to be the ith from a plurality of IECMs. The ECM interpretation unit 145 may comprise a control information extractor (not shown) and control word production apparatus (not shown) each of which perform part of the function of the ECM interpretation unit 145 as described herein, but combination of these functions into a single unit 145 is believed to be preferable and only the ECM interpretation unit 145 is described herein for simplicity of description.

The first generator function $f_1$ may comprise any appropriate function such as, for example, a decryption function or a one-way function such as a hash function, as are well known in the art.

The item control information 140 typically also comprises other information relating to access to an individual broadcast item to be broadcast at some time, whether in the past, in the present, or in the future. Such other information may be similar to information typically included in prior art ECMs, and may include, without limiting the generality of the foregoing, one or more of the following: information defining which recipients may receive the individual broadcast item; one or more prices associated with the individual broadcast item; information defining which recipients may purchase the individual broadcast item; information defining which price a given recipient must pay to purchase the individual broadcast item; and geographic information defining regions within which the individual broadcast item may be received and/or purchased. Preferably, the subscriber unit 110 processes the IECM 130 in accordance with such other information, if present, so that, for example, no further processing is typically performed if the subscriber unit 110 is not authorized to receive the associated individual broadcast item. Similar processing, in the case of prior art ECMs, of such other information is well known in the art.

The headend 100 is also preferably operative to establish other streams, such as, for example, at least one ECM stream 150 and at least one service stream 160, for transmitting from the headend 100 to the subscriber unit 110.

The service stream 160 is typically operative to carry a plurality of items 170, each of the plurality of items 170 being encoded according to a control word. Typically, each one of the control words associated with each one of the plurality of items 170 is different from every other one of the control words.

Figure 1B:
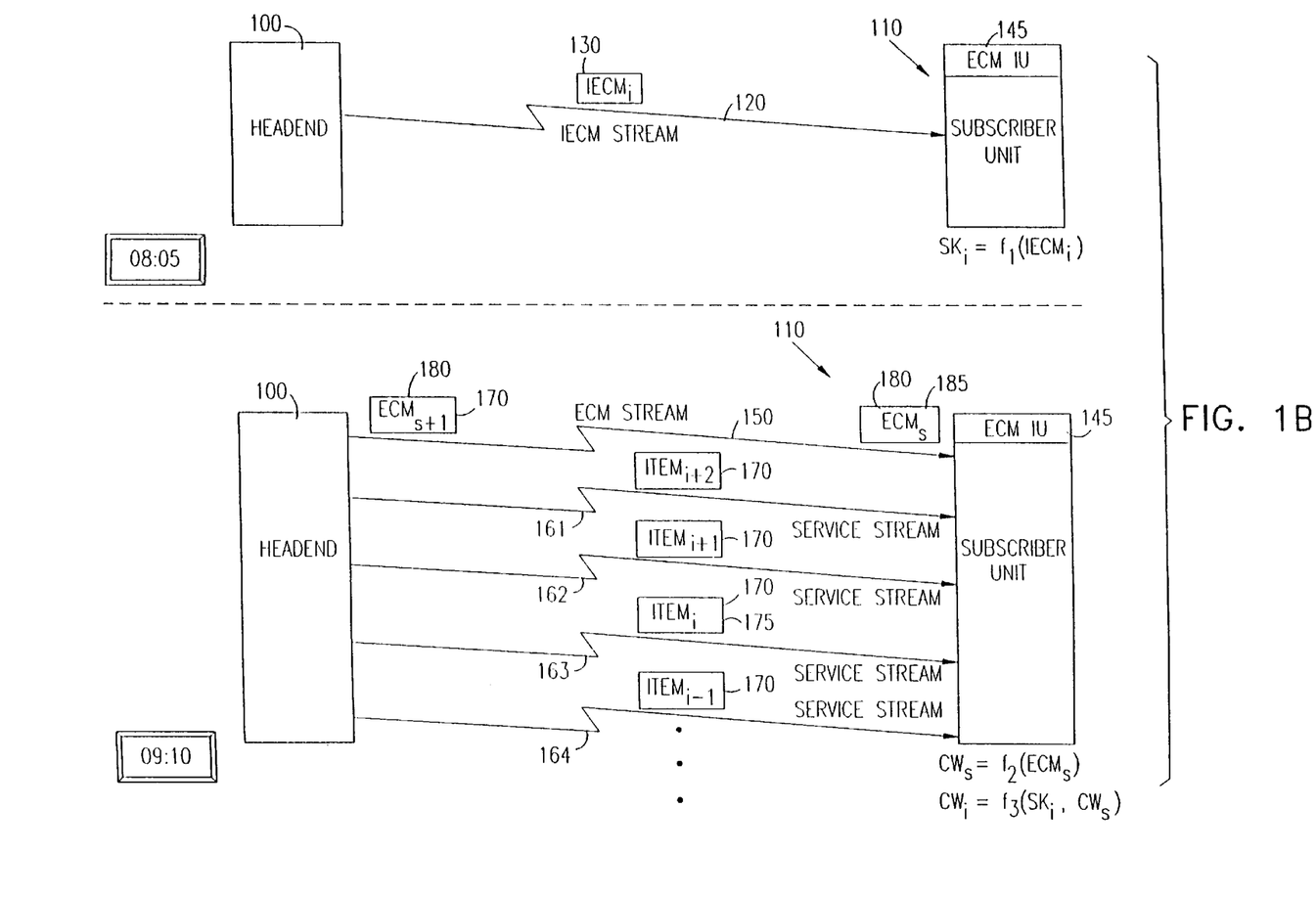
FIG. 1B is a simplified partly pictorial, partly block diagram illustration of a key delivery system constructed in accordance with an alternative preferred embodiment of the present invention.

Reference is now additionally made to FIG. 1B, which is a simplified partly pictorial, partly block diagram illustration of a key delivery system constructed and operative in accordance with an alternative preferred embodiment of the present invention. The system of FIG. 1B is similar to that of FIG. 1A, with the service stream 160 of FIG. 1A being replaced with a plurality of service streams, shown for the sake of simplicity of depiction in FIG. 1B as 4 service streams 161–164, it being appreciated that any appropriate number of service streams may be used. It may be undesirable or impractical, particularly from the standpoint of system resource usage, to establish an ECM stream for each of the service streams 161–164; only one ECM stream 150 is shown in FIG. 1B. It is appreciated that the apparatus and methods described herein with reference to FIG. 1A are also applicable to the system of FIG. 1B.

Referring back to FIG. 1A, the subscriber unit 110 may be authorized to receive and decode a specific item$_i$ 175 of the plurality of items 170, but may not necessarily be authorized to receive and decode any other one of the plurality of items 170.

The ECM stream 150 is typically operative to carry a plurality of stream ECMs 180 including a stream ECM$_s$ 185. The stream ECM$_s$ 185 is associated with the item$_i$ 175, using appropriate methods well known in the art. The stream ECM$_s$ 185 may typically also be associated with at least one other of the plurality of items 170, because the items 175 is typically relatively short in duration and is transmitted asynchronously relative to an ECM stream. It is appreciated that, in the implementation of FIG. 1B, the item$_i$ 175 may also be transmitted simultaneously with at least one other of the plurality of items 170. Thus, time synchronization of the item$_i$ 175 and the associated stream ECM$_s$ 185 in the ECM stream 150 cannot be guaranteed, typically because of the short duration of the item$_i$ 175 and/or because of overlap in time of the item$_i$ 175 with at least one other item 170, and it may therefore be preferred to broadcast a single stream ECM 180 for a plurality of items 170.

Figure 2B:
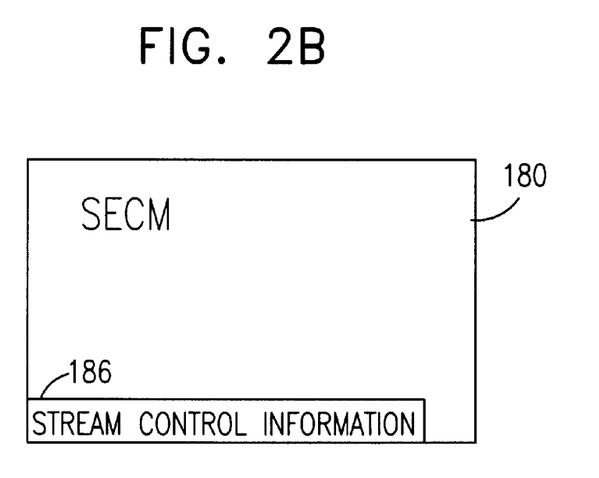
FIG. 2B is a simplified block diagram illustration of a preferred embodiment of a stream ECM of FIG. 1.

Reference is now additionally made to FIG. 2B, which is a simplified block diagram illustration of a preferred implementation of one of the plurality of stream ECMs 180 of FIG. 1. The stream ECM 180 of FIG. 2B preferably comprises stream control information 186.

The subscriber unit 110 is typically operative, upon receiving the stream ECMS 185, to extract the stream control information 186 therefrom, using methods which are well known in the art. The stream control information 186 typically comprises information relating to access to a stream comprising a plurality of broadcast items, as explained above. Preferably, the subscriber unit 110 includes an ECM interpretation unit 145, as described above, which is operative to extract a stream control word CWS from the stream ECMS 185, typically according to a second generator function $f_2$, such that:

$$CW_S = f_2(ECM_s)$$

The second generator function $f_2$ may be equivalent to the first generator function $f_1$ or may alternatively comprise any appropriate function such as, for example, a decryption function or a one-way function such as a hash function, as are well known in the art.

The ECM interpretation unit 145 is then preferably operable to compute an item control word for the item$_i$ 175, typically according to a third generator function $f_3$, such that:

$$CW_i = f_3 (SK_i, CW_s)$$

The third generator function $f_3$ may be equivalent to the first generator function $f_1$ or to the second generator function $f_2$ or may alternatively comprise any appropriate function such as, for example, a decryption function or a one-way function such as a hash function, as are well known in the art. It is appreciated that in a simulcrypt environment as described, for example, in DVB SIM061, "Technical specification of DVB-Simulcrypt", referred to above in the Background of the Invention, the third generator function $f_3$ will typically be shared among different encryption methods which make up the simulcrypt multiple encryption scheme.

It is appreciated that access to the item$_i$ 175 may thus be controlled by access information in any one or combination of the IECM 130 or the stream ECM$_s$ 185, possibly in combination with other access information (not shown) as is well known in the art.

Figure 3:
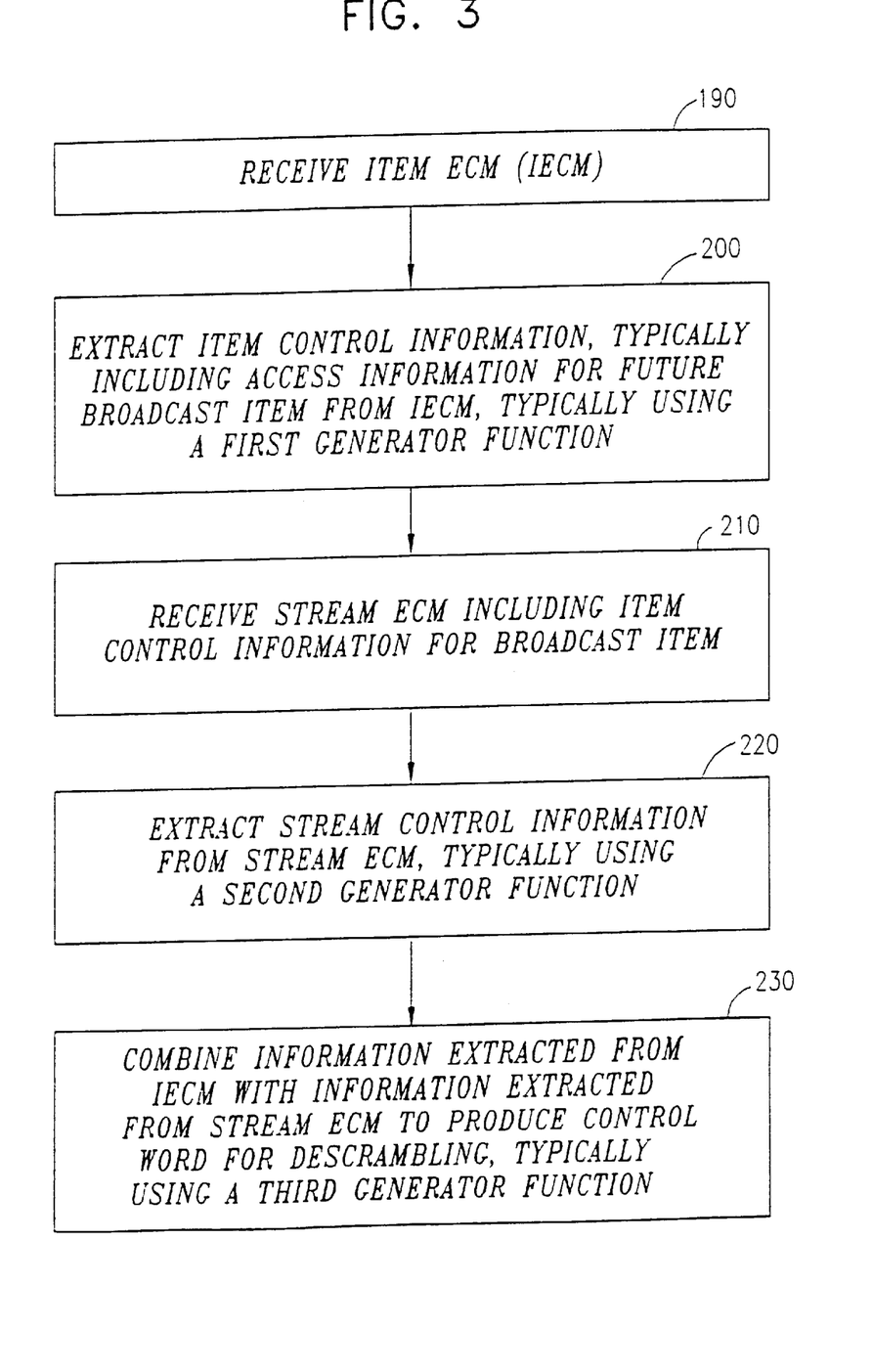
FIG. 3 is a simplified flowchart illustration of a preferred method of operation of the systems of FIGS. 1A and 1B.

Reference is now made to FIG. 3, which is a simplified flowchart illustration of a preferred method of operation of the systems of FIGS. 1A and 1B. The method of FIG. 3 preferably includes the following steps:

When an IECM is received by a subscriber unit (step 190), the subscriber unit extracts item control information relating to a future broadcast item from the IECM, typically using a first generator function (step 200).

When a stream ECM including broadcast control information for the broadcast item is received (step 210), stream control information is extracted from the stream ECM, typically using a second generator function (step 220).

The item control information and the stream control information are combined, typically using a third generator function, to produce a control word for descrambling the broadcast item (step 230).

Figure 4:
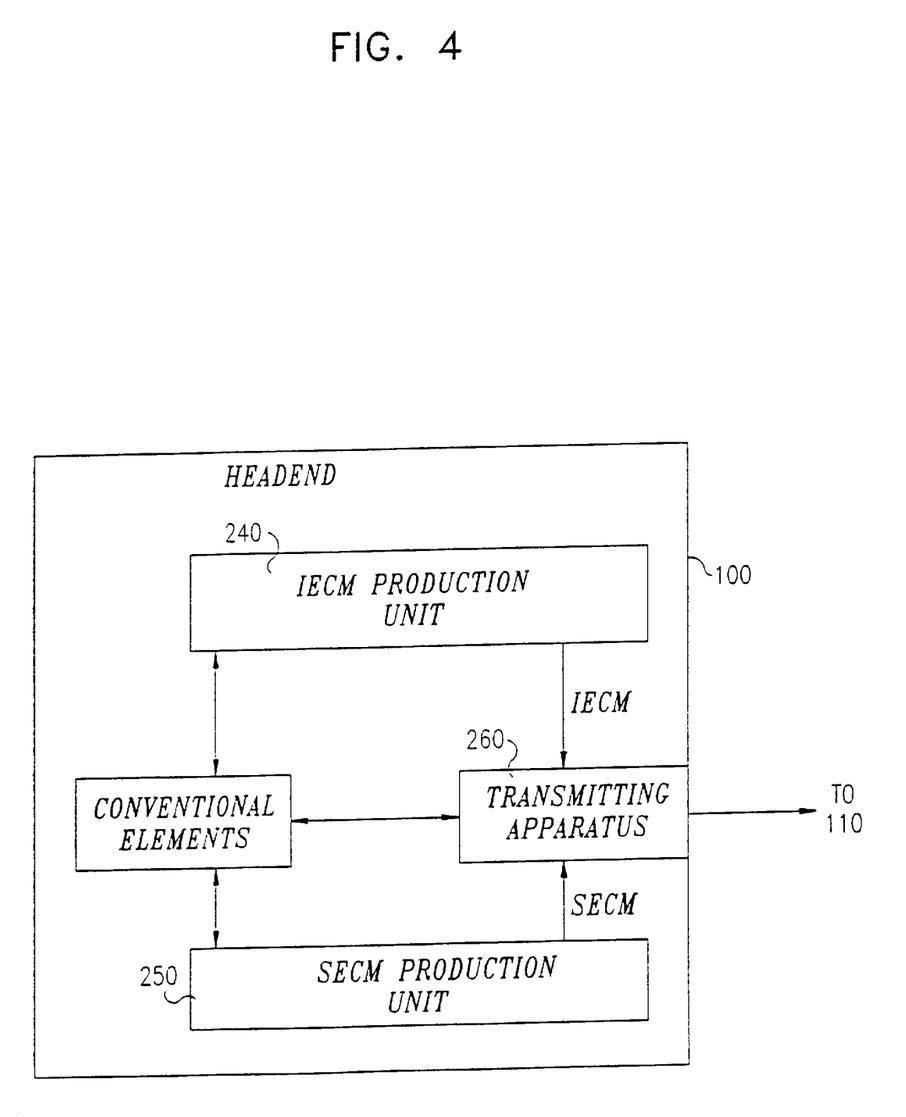
FIG. 4 is a simplified pictorial illustration of a preferred implementation of the headend of FIGS. 1A and 1B.

Reference is now made to FIG. 4 which is a simplified pictorial illustration of a preferred implementation of the headend 100 of FIGS. 1A and 1B. The headend 100 of FIG. 4 comprises an IECM production unit 240 which is preferably operative to produce IECMs. The headend 100 also comprises a SECM production unit 250 which is preferably operative to produce SECMs. Both the IECM production unit 240 and the SECM production unit 250 may typically be implemented in any suitable combination of hardware and software such as, for example, in a suitably programmed microprocessor. The IECM production unit 240 and the SECM production unit 250 are typically in communication with conventional headend elements, well known in the art, which typically provide information and instructions including information on the contents of any IECMs and SECMs produced.

The headend 100 also comprises transmitting apparatus 260, which may comprise any suitable transmitting apparatus. The transmitting apparatus 260 receives one or more IECMs from the IECM production unit 240 and/or one or more SECMs from the SECM production unit 250 and is preferably operative to transmit the IECMs and/or SECMs to the subscriber unit 110 (not shown in FIG. 4).

It is appreciated that the headend 100 typically also comprises many other conventional elements well known in the art.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow.

What is claimed is:

1. A key delivery method for use in an encoded communications system in which a first plurality of encoded items comprising at least a first item encoded with a first item control word and a second item encoded with a second item control word is sent in a communication stream from a sender to a receiver, the method comprising:
   transmitting a first item entitlement control message (IECM) comprising first item control information for controlling only the first item and a second IECM comprising second item control information for controlling only the second item;
   transmitting a stream entitlement control message (SECM) comprising stream control information for controlling more than one item;
   combining at least part of the first item control information and at least part of the stream control information to produce the first item control word; and
   combining at least part of the second item control information and at least part of the stream control information to produce the second item control word,
   wherein said transmitting-IECM step is performed before said transmitting-SECM step.

2. A method according to claim 1 and also comprising:
   performing at least one of the following:
   utilizing the first item control word to decode the first encoded item; and
   utilizing the second item control word to decode the second encoded item.

3. A method according to claim 1 and wherein:
   the first item control information comprises a first item key, and
   the second item control information comprises a second item key, and
   the stream control information comprises a stream key, and
   the combining step comprises: computing the first item control word from the first item key and the stream key; and computing the second item control word from the second item key and the stream key.

4. A method according to claim 1 and wherein:
   the first item control information comprises a first item seed, and
   the second item control information comprises a second item seed,
   the stream control information comprises a stream seed, and
   the combining step comprises:
   computing a first item key from the first item seed using an item key production function;
   computing a second item key from the second item seed using the item key production function;
   computing a stream key from the stream seed using a stream key production function;
   computing the first item control word from the first item key and the stream key; and
   computing the second item control word from the second item key and the stream key.

5. A method according to claim 4 and wherein the step of computing an first item key comprises:
   determining whether the receiver is authorized to compute the first item key and computing the first item key only if the receiver is authorized to compute the item key, and
   the step of computing a second item key comprises:
   determining whether the receiver is authorized to compute the second item key and computing the second item key only if the receiver is authorized to compute the second item key.

6. A method according to claim 4 and wherein the step of computing a stream key comprises:
   determining whether the receiver is authorized to compute the stream key and computing the stream key only if the receiver is authorized to compute the stream key.

7. A method according to claim 1 and wherein the at least one encoded item is transmitted asynchronously to the SECM.

8. A method according to claim 1 and wherein each of said first plurality of encoded items has a time duration, and
   said SECM comprises a second plurality of SECMs transmitted with an average inter-SECM delay, and
   each of said first plurality of encoded items is associated with one of the second plurality of SECMs, and
   the time duration of at least one of said first plurality of encoded items is less than the average inter-SECM delay.

9. A method according to claim 8 and wherein more than one of said first plurality of encoded items is associated with at least one of said second plurality of SECMs.

10. A method according to claim 1 and wherein the first encoded item and the second encoded item are transmitted simultaneously.

11. A method according to claim 1 and wherein at least one of the first item control information and the second item control information comprises item purchase information.

12. A method according to claim 11 and wherein the item purchase information includes item price information.

13. A method according to claim 11 and wherein the item purchase information comprises purchase access information and the method includes:

determining whether the receiver is entitled to purchase at least one of the first item and the second item based, at least in part, on the purchase access information.

14. A method according to claim 11 and wherein the item purchase information comprises access information and the method includes:

determining whether the receiver is entitled to access at least one of the first item and the second item based, at least in part, on the access information.

15. A method according to claim 1 and wherein the stream control information comprises item purchase information.

16. A method according to claim 1 and wherein the first item is broadcast to a plurality of item receivers including the receiver.

17. A method according to claim 16 and wherein the transmitting-IECM step includes broadcasting at least one of the first IECM and the second IECM.

18. A method according to claim 16 and wherein the step of transmitting an SECM includes broadcasting the SECM.

19. A method according to claim 1 and wherein each of the plurality of encoded items has a time duration, and     the time duration of the first item and the time duration of the second item at least partially overlap.

* * * * *